United States Patent
Look et al.

(10) Patent No.: US 8,812,991 B2
(45) Date of Patent: Aug. 19, 2014

(54) KEYBOARD NAVIGATION AMONG VISUAL ELEMENTS IN A USER INTERFACE

(75) Inventors: Gary Look, Medford, MA (US); Kevin Chow, Wakefield, MA (US); Brendon Glazer, Everett, MA (US); Teck Hua Lee, Belmont, CA (US); Ritchard Shadian, San Mateo, CA (US); Prashant Singh, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 13/167,402

(22) Filed: Jun. 23, 2011

(65) Prior Publication Data

US 2012/0293516 A1  Nov. 22, 2012

Related U.S. Application Data

(60) Provisional application No. 61/487,863, filed on May 19, 2011.

(51) Int. Cl.
*G06F 3/048* (2013.01)
*G06F 3/023* (2006.01)
*G06F 17/30* (2006.01)

(52) U.S. Cl.
CPC ........ *G06F 3/0236* (2013.01); *G06F 17/30277* (2013.01)
USPC ............................ 715/855; 715/853; 715/854

(58) Field of Classification Search
CPC ......................... G06F 3/0482; G06F 17/30277
USPC .......................................... 715/853, 854, 855
See application file for complete search history.

(56) References Cited

U.S. PATENT DOCUMENTS

| | | | |
|---|---|---|---|
| 5,717,939 A * | 2/1998 | Bricklin et al. | 715/212 |
| 7,055,108 B2 * | 5/2006 | Goloshubin et al. | 715/853 |
| 7,735,023 B1 | 6/2010 | Chadzelek et al. | |
| 7,844,637 B2 | 11/2010 | Gibson et al. | |
| 2006/0174214 A1 | 8/2006 | McKee et al. | |
| 2009/0089415 A1 | 4/2009 | Lecomte et al. | |
| 2009/0158138 A1 * | 6/2009 | Ruvini | 715/234 |

* cited by examiner

*Primary Examiner* — Andrey Belousov
(74) *Attorney, Agent, or Firm* — Miles & Stockbridge P.C.

(57) ABSTRACT

A system navigates among visual elements of a user interface. The system receives a keystroke indicating navigating from a current visual element in a first direction, determines a next visual element that is substantially near the current visual element and in the first direction, and navigates to the next visual element.

18 Claims, 7 Drawing Sheets

KEYBOARD NAVIGATION AMONG VISUAL ELEMENTS IN A USER INTERFACE

RELATED APPLICATIONS

This application claims priority to U.S. Provisional Patent Application No. 61/487,863, filed May 19, 2011, the specification of which is hereby incorporated by reference.

FIELD

One embodiment is directed generally to a computer system, and in particular to keyboard navigation among visual elements in a user interface.

BACKGROUND INFORMATION

Users interact with a software application using user interface ("UI") visual elements presented by the software application. Some UI elements have fields that can be used by the user to provide input using a keyboard. Some UI elements have associated commands for the software application that are executed when the user selects the UI element. Buttons and menus are examples of UI elements that have associated commands.

Many users of a software application require the ability to interact with and traverse among the UI elements presented by the software application efficiently using a keyboard. Software applications typically provide navigation keys and activation keys to allow users to interact with the UI elements using the keyboard. The user presses the navigation keys to shift input focus between or among the UI elements of the software application. Tab chain navigation is one example of using navigation keys to navigate the UI elements of a software application. In tab chain navigation, UI elements for the software application are in effect grouped into a list, which can be circular. The elements in any particular list are typically those available on one display screen. Pressing the TAB key changes the input focus from one UI element to the next UI element in the list. In some environments, pressing shift-TAB changes the input focus to a previous UI element in the list.

Tab chain navigation can be slow when navigating from a currently selected UI element to a desired UI element. The user must press the TAB key to navigate through all the intermediate UI elements between the UI element currently having input focus and the desired UI element in order to access the desired UI element.

Some applications make use of a visual component that is formed from multiple contiguous visual elements. For example, a map of the United States is formed, for the most part, from multiple contiguous states. If a user wants to navigate between states, the user can use a mouse to click on an individual state. However, using keyboard navigation such as tab chain navigation may force the user to traverse a predetermined list of states before arriving at the desired state, even if the desired state is adjacent to the current state.

SUMMARY

One embodiment is a system for navigating among visual elements of a user interface. The system receives a keystroke indicating navigating from a current visual element in a first direction, determines a next visual element that is substantially near the current visual element and in the first direction, and navigates to the next visual element.

DETAILED DESCRIPTION

One embodiment is a system that allows a user to navigate among visual elements of a visual component on a user interface using a keyboard. A user can use the keyboard's up, down, left and right keys to easily navigate to an adjacent or next element that is above, below, to the left or to the right of the currently selected element within the visual component. The system dynamically determines the closest or adjacent element in the direction indicated by the keystroke.

Figure 1:
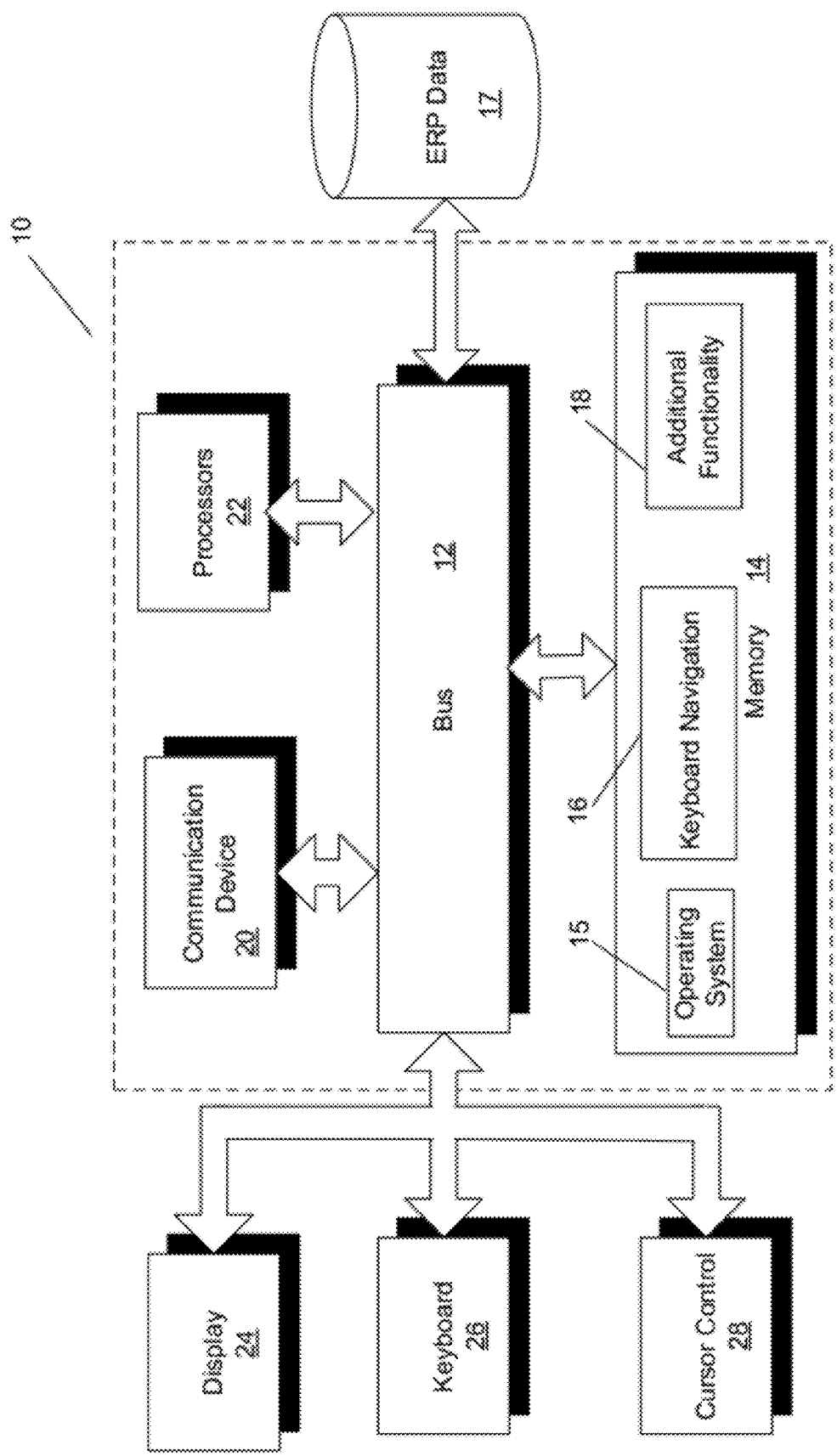
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a keyboard navigation module 16 that provides keyboard navigation among visual elements in a UI, as disclosed in more detail below. System 10 can be part of a larger system, such as a mapping system or an enterprise resource planning ("ERP") system. Therefore, system 10 will typically include one or more additional functional modules 18 to include the additional functionality. A database 17 is coupled to bus 12 to provide centralized storage for modules 16 and 18 and store mapping data, inventory data, etc.

Figure 2:
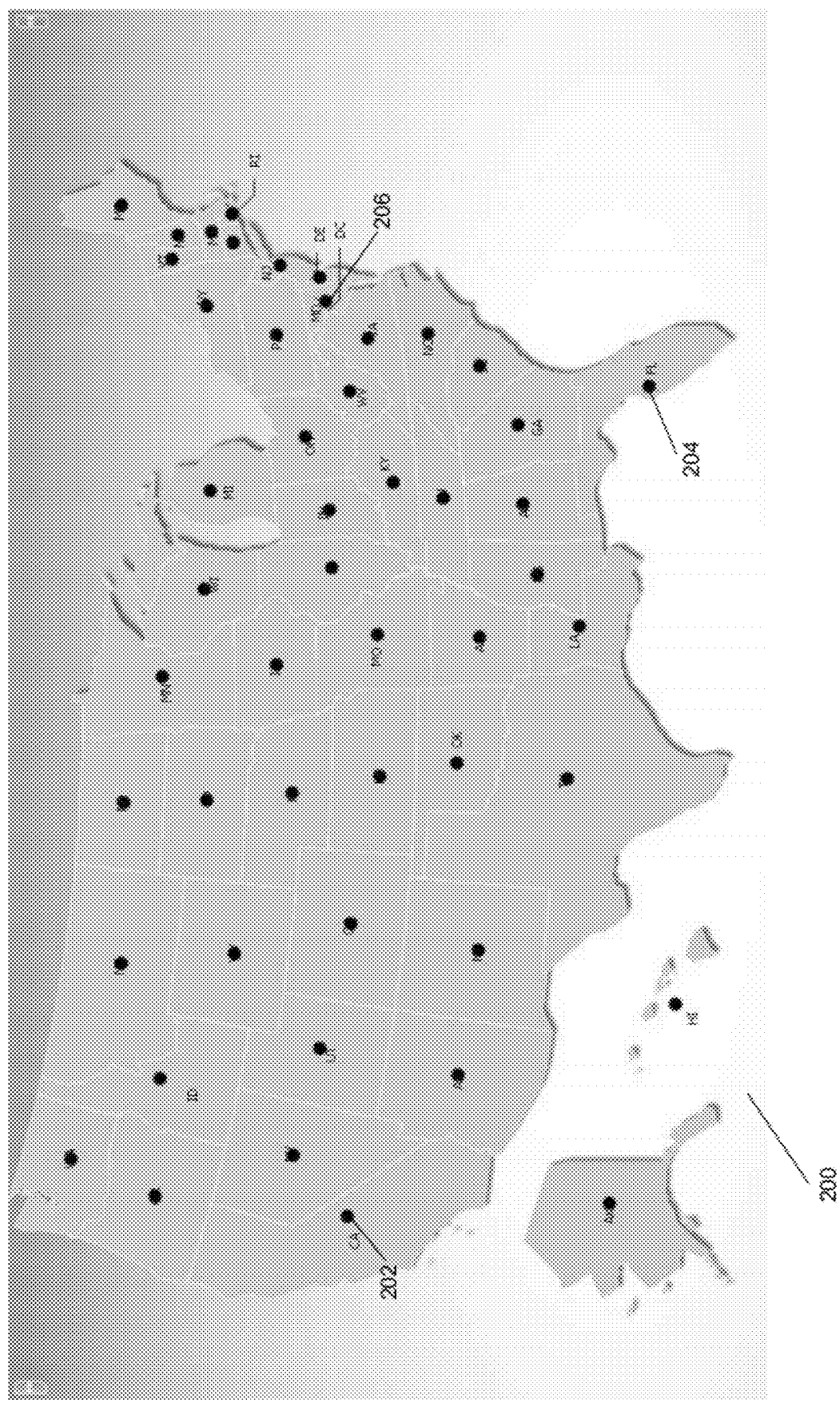
FIG. 2 illustrates an example of a component of a user interface that includes multiple visual elements.

FIG. 2 illustrates an example of a component 200 of a user interface that includes multiple visual elements. Component 200 is a map of the United States. Component 200 may have been generated by any type of application, and may have been generated in response to a query. Component 200 may include indicators/markers as a result of a search. For example, a user may have searched for all "Daisy Doughnut" shops in the U.S. In return, component 200 may be generated and may be populated with markers that indicate the location of each doughnut shop.

A user interacting with component 200 may desire to select one of the states, or navigate among the states, or navigate or select a displayed marker, or navigate among any other type of visual element shown on component 200. Component 200 may be formed of multiple "layers" so that one layer would display the states and allow a user to navigate among the states, another layer may display the markers as a result of a search, and allow a user to navigate among the markers, etc. In prior art systems, a user may be able to use a mouse to click internally to one of the states, thus selecting that state, or to click on a marker. An indication that the state is selected may be provided by changing the color of the border of the selected state, animating the border, etc., and a similar indication can be provided on a selected marker. However, it may be difficult for a user to select a state with a mouse, especially for smaller states such as Vermont and New Hampshire where clicking on the interior of a specific state can be challenging, or a marker that is close to one or more other markers. Further, a user may wish to use a keyboard rather than a mouse to navigate for various other reasons such as usability and accessibility.

In many prior art systems, in order to use the keyboard to navigate between states or markers, tab chain navigation, as described above, is typically used. However, tab chain navigation usually is based on a predetermined circular list. Therefore, if a user wants to jump from California to Arizona, the tabbing might first go through Nevada and Utah and other states before Arizona if that is the predetermined order of the tab list.

In one embodiment, the problems with the prior art are avoided by representing each visual element or item that a user can navigate to as a point. In the example with markers, the marker itself is the point. For two-dimensional shapes, such as the states in the example shown in FIG. 2 where each state is represented as a polygon, the center of the shape's bounding box can be determined and this point is used to represent the shape. In the example of FIG. 2, the points include point 202 (for California), point 204 (for Florida), point 206 (for Maryland), etc.

In one embodiment, keyboard navigation module 16 awaits a keyboard command that indicates the user wants to navigate from the current selected visual element to a different visual element, or wants to select a different visual element. Any type of keystroke can be defined to indicate any type of navigation or selection. In one embodiment, either the up, down, left, or right keystroke is used to indicate navigation in one of four possible directions. When one of these keystrokes is received, module 16 sweeps out two angles in the direction of the keystroke with vertices located at the current selected point or element, "C". In one embodiment, the two angles are 40 and 80 degrees. The angles are centered along an axis defined by the direction of the keystroke.

Figure 3:
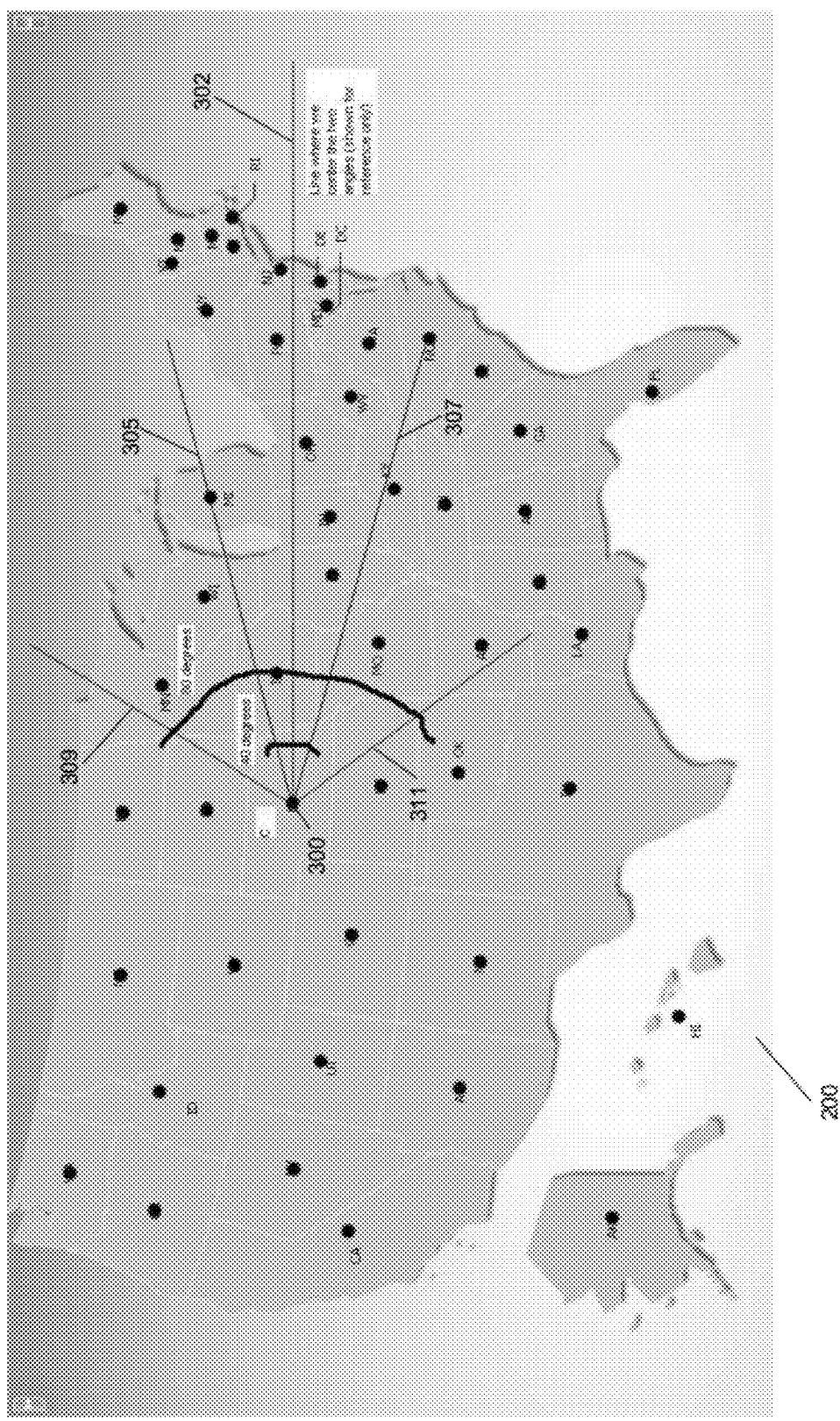
FIG. 3 illustrates an example of the component when a right keystroke is received.

FIG. 3 illustrates an example of the component 200 when a right keystroke is received. The current selected point C (point 300) is in the state of Nebraska, and the axis 302 indicates the direction of the right keystroke. Axis 302 would be rotated to handle other directions. The 40 degree sweep is indicated and surrounded by lines 305 and 307, and the 80 degree sweep is indicated by lines 309 and 311. The lines and text shown in FIG. 3 and the subsequent figures are used to indicate the functionality of keyboard navigation module 16. They are typically not actually visible to the user who is navigating among visual elements. Embodiments then iterate through every point, "P" on the visual component, or a subset of the points, in the direction of the keystroke press, and compute a distance metric between P and the current selected point C. In one embodiment, only the points in the direction of the keystroke press are evaluated/iterated. For example, for a right keystroke, only those points whose x-coordinates are greater than the x-coordinate of the current selected point C are considered. If it is a left keystroke, only those points whose x-coordinates are less than the x-coordinate of the current selected point are considered.

Figure 4:
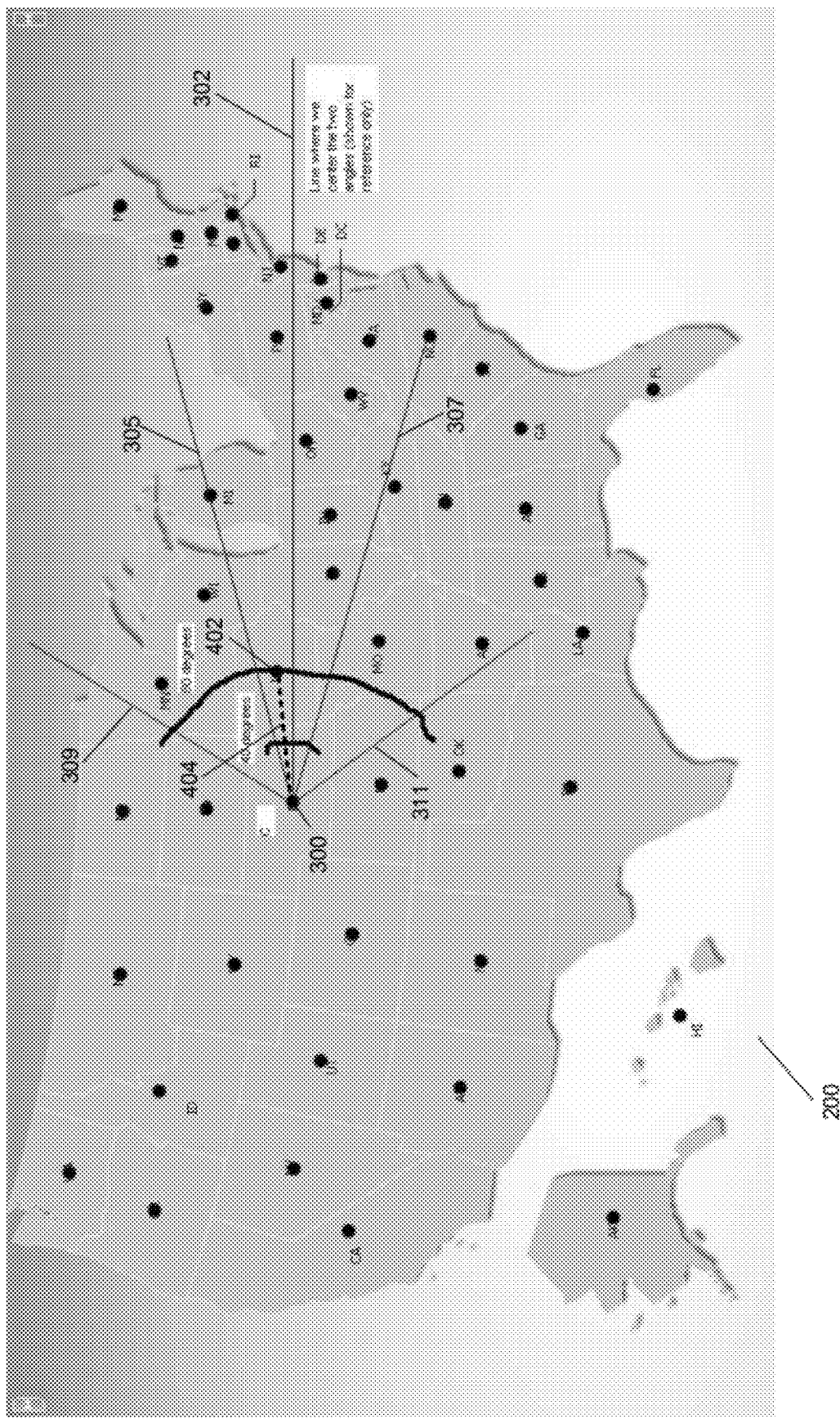
FIG. 4 illustrates an example of the component and a distance metric when a visual element point is within a smaller angle sweep.

If a point P falls within the smaller of the two angles in the sweep, the straight-line distance between P and C is used for the distance metric. FIG. 4 illustrates an example of the component 200 and the distance metric when P is point 402 and therefore is within the smaller angle sweep. Because P falls within the 40 degree sweep, the distance metric is the length of dotted line 404, which is the straight line distance between C and point 402.

Figure 5:
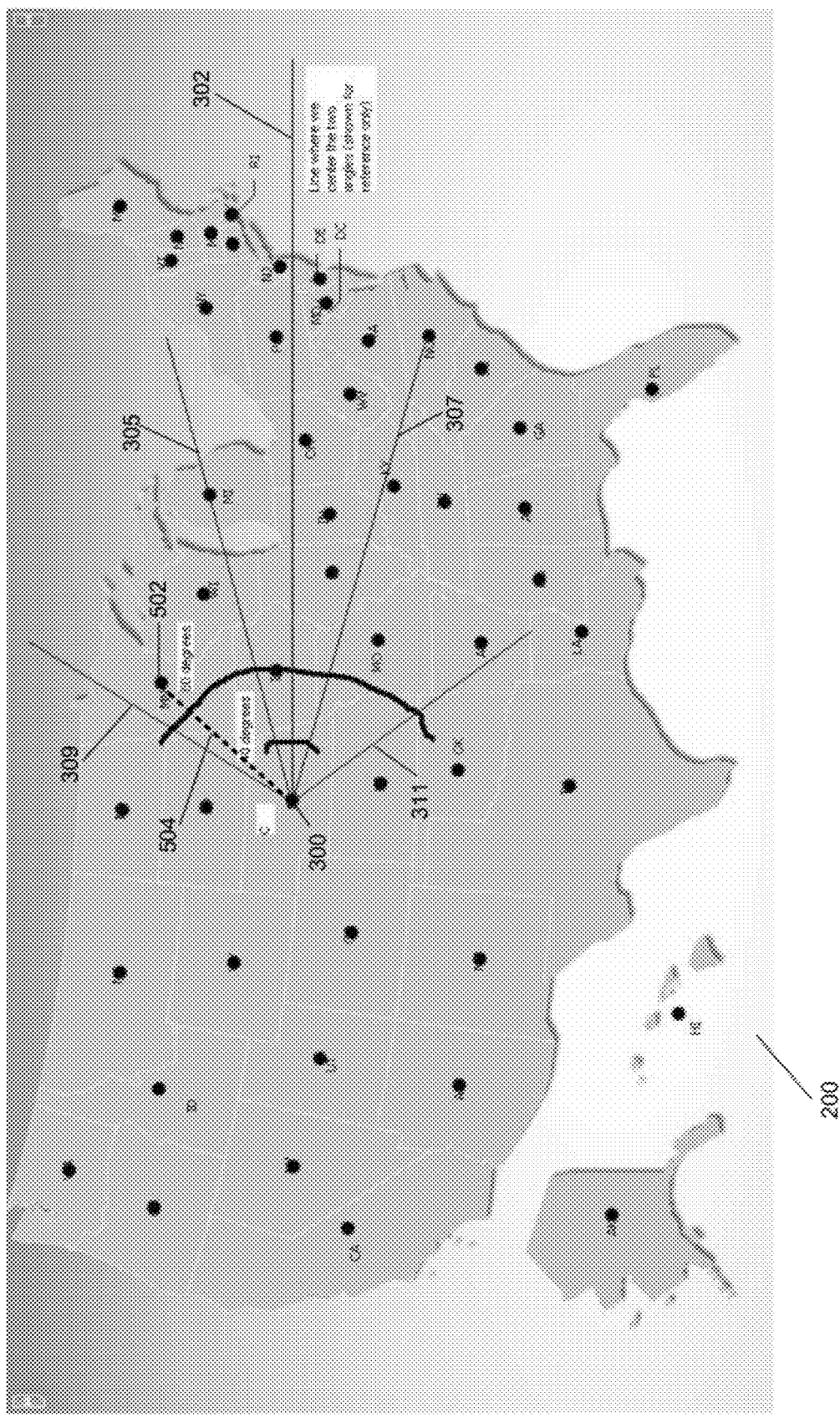
FIG. 5 illustrates an example of the component and the distance metric when the point is outside the smaller angle sweep but within a bigger angle sweep.

However, if P falls outside of the smaller angle but within the bigger angle, embodiments multiply the straight-line distance between P and C by a distance penalty t1. FIG. 5 illustrates an example of the component 200 and the distance metric when P is point 502 and is outside the smaller angle sweep but within the bigger angle sweep. The distance metric for point 502 is the length of dotted line 504, which is the straight line distance between C and point 502, multiplied by t1.

Figure 6:
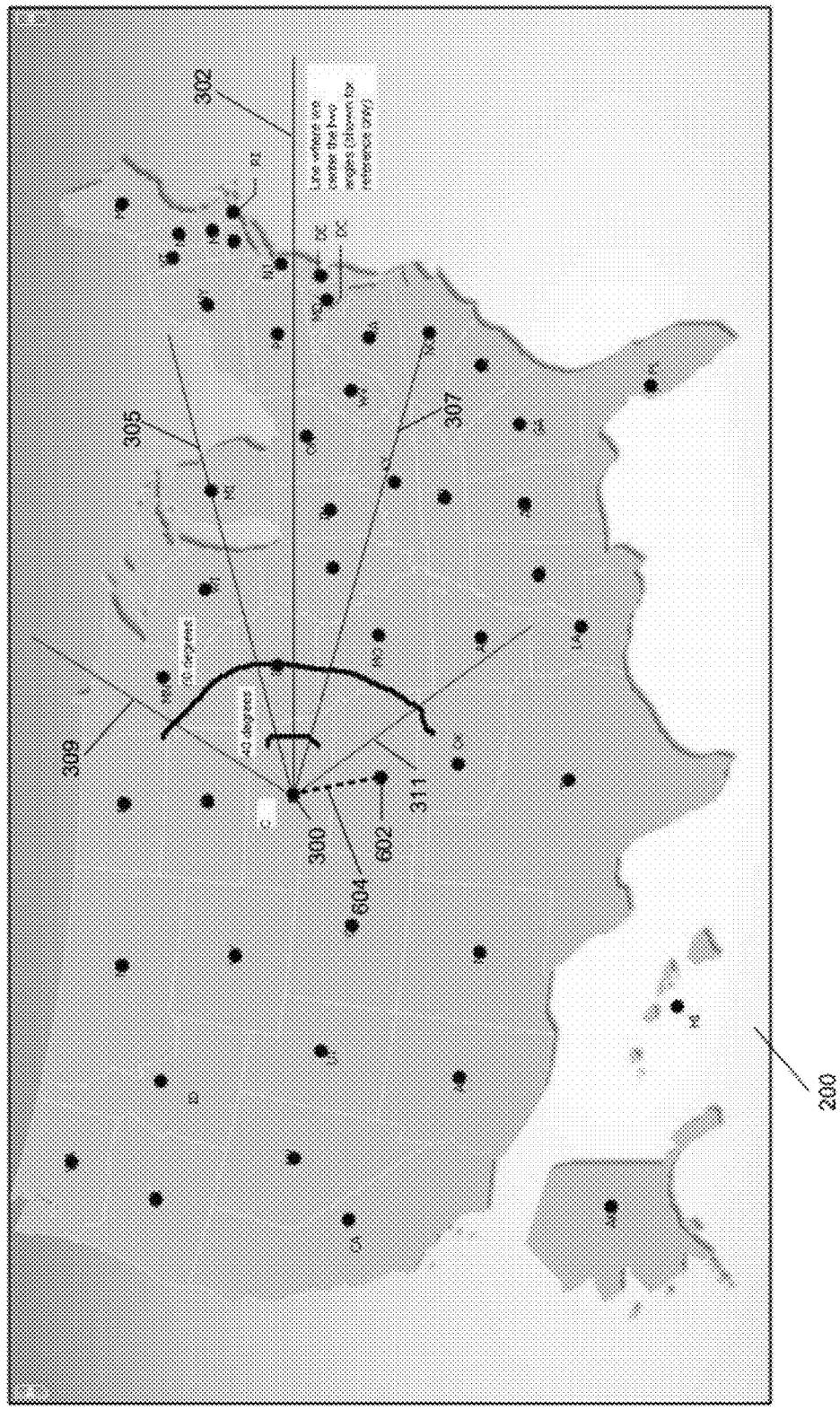
FIG. 6 illustrates an example of the component and the distance metric when the point is outside the bigger angle sweep.

Further, if P falls outside of the bigger angle, embodiments multiply the straight line distance between P and C by an even larger penalty, t2 (i.e., t2 is greater than t1). FIG. 6 illustrates an example of the component 200 and the distance metric when P is point 602 and is outside the bigger angle sweep. The distance metric for point 602 is the length of dotted line 604, which is the straight line distance between C and point 602, multiplied by t2. In one embodiment, t1=2 and t2=6, but any values can be used.

In some embodiments with two dimensional shapes/elements, such as states, it is desired to navigate to adjacent elements if possible. In these embodiments, it is determined if the shapes represented by points P and C touch one another. If the two shapes touch, then for all subsequent points that are considered, the shapes represented by those points must also touch the shape represented by C.

Embodiments then record the point "S" that is the shortest distance away from the current selected point C. After all points in the direction of the keystroke, or all total points, have been examined, the current selected point becomes S, and the user is navigated to the visual element represented by S.

Figure 7:
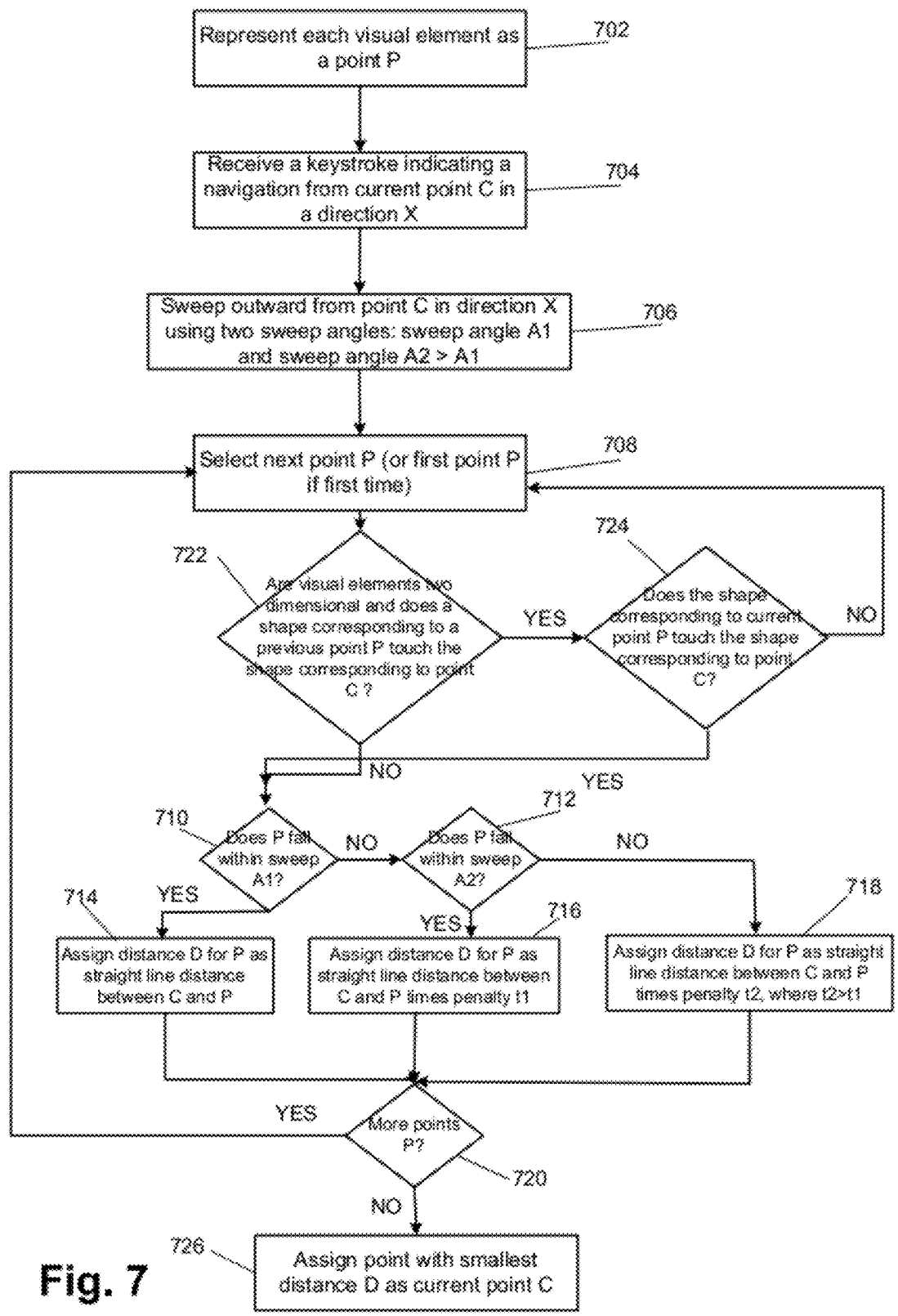
FIG. 7 is a flow diagram of the functionality of keyboard navigation module of FIG. 1 when providing keyboard navigation among visual elements in a UI in accordance with one embodiment.

FIG. 7 is a flow diagram of the functionality of keyboard navigation module 16 of FIG. 1 when providing keyboard navigation among visual elements in a UI in accordance with one embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, each visual element is represented by a point P. For two dimensional elements, the location of the point can be determined by using the center of a bounding box. However, any other method can be used.

At 704, module 16 receives a keystroke indicating a navigation from current point C in a direction X. In one embodiment, the possible keystrokes are the up, down, left, or right keystroke, but any type of directional keystroke can be used.

At 706, module 16 sweeps outward from current point C in direction X using two sweep angles: sweep angle A1 and sweep angle A2. Angle A2 is greater than angle A1 so that it encloses angle A1. The sweep angles define two sectors.

At 708, an iteration for each point P or a subset of the point Ps is initiated. Either the first point P (if this is the first time 708 is executed) or the next point P is selected.

At 722, in an optional function when adjacency is desired, it is determined if the visual elements are two dimensional, such as with the states example disclosed above, and if a shape corresponding to a previous iterated point P touches the shape corresponding to point C. If yes at 722, at 724 it is determined if the shape corresponding to the current point P touches the shape corresponding to point C. If no at 724, the current point P is eliminated from consideration as the selected point and functionality continues at 708. This ensures that the selected point will correspond to a shape that is adjacent to the initial current shape, if possible.

If no at 722, or yes at 724, at 710, for the selected point P at 708, it is determined if P falls within sweep A1. If yes, at 714 the distance D for P is assigned as the straight line distance between C and P.

If no at 710, at 712 it is determined if P fall within sweep A2. If yes, at 716 the distance D for P is assigned as the straight line distance between C and P times a numerical penalty t1.

If no at 712, the distance D for P is assigned as the straight line distance between C and P times a numerical penalty t2. Penalty t2 is greater than penalty t1.

At 720, it is determined if there are more points to be analyzed. In one embodiment, all points on the visual component are analyzed. In other embodiments, a subset of the points are analyzed, as disclosed above. If there are more points, the functionality continues at 708.

If there are no more points at 720, at 726, all candidate points P have been analyzed and assigned a distance D. Therefore, the point P with the smallest corresponding D is assigned as the point of the current/next point C. The cursor or other navigation device is then moved to the newly assigned point C, or the corresponding shape is selected. As a result, module 16 dynamically determines the closest or adjacent element ("substantially near") in the direction indicated by the keystroke, and navigates to that determined element.

In another embodiment, as each point is processed, module 16 keeps track of what point is closest to the current point, and what the distance is from that point to the current point. Whenever module 16 computes the distance D between a point P and the current point C, it checks if this distance D is shorter than the shortest distance compiled so far. If it is, then the shortest distance is updated and the point that has the shortest distance is recorded. In this embodiment, the next point is identified as soon as the iteration over the set of points in 708 is completed.

As disclosed, embodiments allow a user to navigate among the items displayed within the visual component using the keyboard's arrow keys. The user can use the keyboard's up, down, left, and right keys in one embodiment to navigate to items that are above, below, to the left, or to the right of the currently selected item within the visual component. This type of interaction model provides natural, intuitive keyboard navigation to users.

Based on which arrow key is pressed, embodiments use adjacency relationships and distance measurements to determine what the next item to navigate to should be. Each visual component can independently determine how adjacency and distance between displayed elements should be computed by varying predetermined constants such as the penalty multipliers. Further, a component can choose two items to be adjacent if they have a shared edge, or two items can be adjacent if their bounding boxes overlap, etc. Distance between two items can be measured as the distance between the centers of the two items.

The displayed items or visual elements can be organized in different logical layers. For example, if the visual component is a map, the countries can belong to one layer while the cities shown on the map can belong to another. Embodiments allow users to navigate between displayed elements that are within the same logical layer and it can also allow users to switch between logical layers. For the above example, a user can choose to first navigate among the countries and then switch to navigating among the cities.

Embodiments can also allow navigating to only the same type of objects or just navigating to the object that is closest to the current object. For example, a user can navigate all the adjacent city markers or just let the arrow keys take them from the city to the state which is nearest their current position.

Embodiments allow for a more natural, free-form method of navigating among the displayed items because it takes advantage of the spatial layout of the displayed items shown by the visual component.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to navigate among a plurality of contiguous visual elements of a user interface, the navigating comprising:

represent each of the visual elements as a point, wherein each of the visual elements comprises a two-dimensional shape;

receive a keystroke indicating navigating from a current visual element in a first direction;

determine if at least one of the plurality of contiguous visual elements is adjacent to the current visual element comprising determining if at least one of the plurality of contiguous visual elements shares an edge with the current visual element;

determine a next visual element that is substantially near the current visual element and in the first direction and is adjacent to the current visual element, wherein the next visual element is adjacent to the current visual element when the current visual element and the next visual element have a shared edge;
navigate to the next visual element, wherein the next visual element is the closest adjacent visual element to the current visual element when it is determined that at least one of the plurality of contiguous visual elements is adjacent to the current visual element; and
when a non-adjacent visual element is closer to the current visual element than an adjacent visual element based on respective representative points, navigate to the adjacent visual element.

2. The computer readable medium of claim 1, further comprising representing each of the visual elements as the point to generate a plurality of visual element points.

3. The computer readable medium of claim 2, wherein the determine comprises:
generate a first outward sweep from a current visual element point in the first direction having a first angle;
generate a second outward sweep from the current visual element point in the first direction having a second angle;
wherein the second angle is greater than the first angle.

4. The computer readable medium of claim 3, further comprising for one or more of the visual element points:
when a first point falls within the first outward sweep, assign a distance as a first straight line distance from the current visual element point to the first point;
when a second point falls within the second outward sweep and outside of the first outward sweep, assign the distance as a second straight line distance from the current visual element point to the second point multiplied by a first penalty;
when a third point falls outside the second outward sweep, assign the distance as a third straight line distance from the current visual element point to the second point multiplied by a second penalty;
wherein the second penalty is greater than the first penalty.

5. The computer readable medium of claim 4, wherein the one or more of the visual element points consists of adjacent points that correspond to visual elements that are adjacent to the current visual element.

6. The computer readable medium of claim 1, wherein the navigate to the next visual element comprises animating the next visual element.

7. The computer readable medium of claim 3, wherein the first angle is approximately 40 degrees and the second angle is approximately 80 degrees.

8. The computer readable medium of claim 1, wherein the keystroke comprises one of an up keystroke, a down keystroke, a left keystroke, or a right keystroke.

9. A computer implemented method for navigating among contiguous visual elements of a user interface, the method comprising:
represent each of the visual elements as a point, wherein each of the visual elements comprises a two-dimensional shape;
receiving a keystroke indicating navigating from a current visual element in a first direction;
determining if at least one of the plurality of contiguous visual elements is adjacent to the current visual element comprising determining if at least one of the plurality of contiguous visual elements shares an edge with the current visual element;
determining a next visual element that is substantially near the current visual element and in the first direction and is adjacent to the current visual element, wherein the next visual element is adjacent to the current visual element when the current visual element and the next visual element have a shared edge;
navigating to the next visual element, wherein the next visual element is the closest adjacent visual element to the current visual element when it is determined that at least one of the plurality of contiguous visual elements is adjacent to the current visual element; and
when a non-adjacent visual element is closer to the current visual element than an adjacent visual element based on respective representative points, navigating to the adjacent visual element.

10. The method of claim 9, further comprising representing each of the visual elements as the point to generate a plurality of visual element points.

11. The method of claim 10, wherein the determine comprises:
generating a first outward sweep from a current visual element point in the first direction having a first angle;
generating a second outward sweep from the current visual element point in the first direction having a second angle;
wherein the second angle is greater than the first angle.

12. The method of claim 11, further comprising for one or more of the visual element points:
when a first point falls within the first outward sweep, assigning a distance as a first straight line distance from the current visual element point to the first point;
when a second point falls within the second outward sweep and outside of the first outward sweep, assigning the distance as a second straight line distance from the current visual element point to the second point multiplied by a first penalty;
when a third point falls outside the second outward sweep, assigning the distance as a third straight line distance from the current visual element point to the second point multiplied by a second penalty;
wherein the second penalty is greater than the first penalty.

13. The method of claim 12, wherein the one or more of the visual element points consists of adjacent points that correspond to visual elements that are adjacent to the current visual element.

14. A system comprising:
a processor;
a computer readable medium coupled to the processor and storing instructions;
a keyboard coupled to the processor;
wherein the instructions, when executed by the processor, comprise:
generate a user interface comprising a plurality of contiguous visual elements;
represent each of the visual elements as a point, wherein each of the visual elements comprises a two-dimensional shape;
receive a keystroke from the keyboard indicating navigating from a current visual element in a first direction;
determine if at least one of the plurality of contiguous visual elements is adjacent to the current visual element comprising determining if at least one of the plurality of contiguous visual elements shares an edge with the current visual element;
determine a next visual element that is substantially near the current visual element and in the first direction and is adjacent to the current visual element, wherein the next visual element is adjacent to the current visual element when the current visual element and the next visual element have a shared edge; and navigate to the next visual element, wherein the next visual element is the closest adjacent visual element to the current visual element when it is determined that at least one of the plurality of contiguous visual elements is adjacent to the current visual element; and when a non-adjacent visual element is closer to the current visual element than an adjacent visual element based on respective representative points, navigate to the adjacent visual element.

15. The system of claim 14, further comprising representing each of the visual elements as the point to generate a plurality of visual element points.

16. The system of claim 15, wherein the determine comprises:

generating a first outward sweep from a current visual element point in the first direction having a first angle;

generating a second outward sweep from the current visual element point in the first direction having a second angle;

wherein the second angle is greater than the first angle.

17. The system of claim 16, further comprising for one or more of the visual element points:

when a first point falls within the first outward sweep, assigning a distance as a first straight line distance from the current visual element point to the first point;

when a second point falls within the second outward sweep and outside of the first outward sweep, assigning the distance as a second straight line distance from the current visual element point to the second point multiplied by a first penalty;

when a third point falls outside the second outward sweep, assigning the distance as a third straight line distance from the current visual element point to the second point multiplied by a second penalty;

wherein the second penalty is greater than the first penalty.

18. The system of claim 17, wherein the one or more of the visual element points consists of adjacent points that correspond to visual elements that are adjacent to the current visual element.

* * * * *